United States Patent [19]

Fujiwara et al.

[11] Patent Number: 4,897,589
[45] Date of Patent: Jan. 30, 1990

[54] APPARATUS FOR INDEXING AN ORIGIN OF A MOVING MEMBER

[75] Inventors: Takashi Fujiwara, Okazaki; Kiyotaka Ohara, Nagoya, both of Japan

[73] Assignee: Brother Kogyo Kabushiki Kaisha, Nagoya, Japan

[21] Appl. No.: 194,195

[22] Filed: May 16, 1988

[30] Foreign Application Priority Data

May 15, 1987 [JP] Japan .................................. 62-119346

[51] Int. Cl.$^4$ ............................................. G05B 19/40
[52] U.S. Cl. .................................... 318/685; 318/696; 400/903; 400/322; 360/78.13
[58] Field of Search ................ 318/685, 696; 400/903, 400/322, 54; 360/78

[56] References Cited

U.S. PATENT DOCUMENTS

| | | | |
|---|---|---|---|
| 4,394,696 | 7/1983 | Yoshimaru | 360/78.02 |
| 4,602,882 | 7/1986 | Akazawa | 400/322 |
| 4,633,346 | 12/1986 | Sasaki et al. | 360/78 |
| 4,669,900 | 6/1987 | Miyake et al. | 400/322 |
| 4,706,008 | 11/1987 | Cronch et al. | 318/696 |
| 4,707,649 | 11/1987 | Konemura | 318/685 |
| 4,714,361 | 12/1987 | Yamakawa et al. | 400/144.2 |

FOREIGN PATENT DOCUMENTS 2817209  9/1979  Fed. Rep. of Germany .

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

Disclosed herein is an origin indexing apparatus applicable to a printer. A moving member, such as a printing head mounted on a carriage, is moved by a stepper motor which rotates in stepwise fashion by sequentially changing excited phase by a predetermined number K. An initially set origin of such a moving member is exactly indexed or identified in a later origin indexing operation according to the relationship between the phase difference between excited phases of the stepper motor at the time of initial setting of the origin and the origin indexing operation and the number of phases K of the stepper motor. One of three positions is indexed as the origin based upon this relationship, including a center position corresponding to a subsequent specified phase appearing in the same cycle following the indexed excited phase, and positions downstream and upstream of the center position.

8 Claims, 5 Drawing Sheets

APPARATUS FOR INDEXING AN ORIGIN OF A MOVING MEMBER

BACKGROUND OF THE INVENTION

The present invention relates to an apparatus for indexing the origin of a moving member to be driven with a stepper motor. This apparatus is applicable to the indexing of the origin of a carriage on a printer or typewriter.

The position of carriages on some of the conventional printers and typewriters is controlled incrementally by open-loop control using a stepper motor. In this incremental position control system, the origin of the carriage must be set in order to know its present position. To this effect, the arrival of the carriage at a predetermined position on the path of its movement is detected with the combination of a contactor and a limit switch or of a light-shielding element and a photointerrupter which are provided at said predetermined position and on the carriage. When the detector consisting of a light-shielding element and a photointerrupter (or a contactor and a limit switch) outputs an origin signal, the position of the carriage at that time is indexed as the origin of the carriage.

The above described detector depends on a mechanical contactor for detecting the position of the moving carriage relative to the fixed frame, so in the face of temperature changes or mechanical vibrations, the subtle relationship between the excited phases of a stepper motor and the timing of detection of an origin signal will vary and in each origin indexing operation, the excited phase of the stepper motor, or its rotational angle, occurring at the time when the origin signal is detected varies and fails to attain a constant value.

In order to solve these problems and to ensure more precise origin indexing by matching the origin to the excited phase at all times of origin indexing operations, a method depending on the principle depicted in FIG. 5(a) has been proposed. In this method, a four-phase excitation stepper motor is allowed to rotate counterclockwise toward the origin until an origin signal is produced, and thereafter, the motor is rotated with excitation being performed up to the first specified phase, say, phase D, and a position P7 corresponding to said specified excited phase D is indexed as the origin.

As already pointed out, the relationship between the origin signal as an output from the detector and the excited phase is subject to change on account of temperature changes or mechanical vibrations. Therefore, depending upon the timing of origin signal detection with respect to the specified excited phase D which corresponds to the origin P7, the origin indexing position determined by the system described above might shift by one cycle of excited, i.e. by four steps, either leftward or rightward with respect to the origin P7, leading to erroneous indexing of position P3 or P11 as the origin.

For instance, if position P7 is assumed to be the true origin in FIG. 5(a), it can be correctly indexed if the origin signal is detected within the range leftward of position P11 and rightward of position P7. On the other hand, if the origin signal is detected within the range leftward of position P7 and rightward of position P3, the latter position P3 is indexed as the origin, which is deviated by 4 steps leftward of the true origin P7. This means that if the timing of origin signal detection in the vicinity of position P7 changes even slightly to the left of position P7, an error of 4 steps can occur in the precision of origin indexing.

The true origin P7 can also be indexed if the origin signal is detected within the range leftward of position P11 and rightward of position P7. However, if the origin signal is detected within the range leftward of position P15 and rightward of position P11, the latter position P11 is indexed as the origin, which is deviated by 4 steps rightward of the true origin P7. This means that if the timing of original signal detection in the vicinity of position P11 changes even slightly to the right of position P11, an error of 4 steps can occur in the precision of origin indexing.

As described above, the prior art methods of origin indexing have had the disadvantage of low precision of indexing operations that result from the instability in the origin indexing position.

SUMMARY OF THE INVENTION

The present invention has been accomplished in order to solve the aforementioned problems of the prior art. Accordingly, an object of the present invention is to improve the precision of indexing the origin of a moving member to be driven with a stepper motor.

Generally, the above-stated object of the present invention is attained by an origin indexing apparatus having the composition shown in FIG. 1. This apparatus comprises a detector that outputs an origin signal when a moving member to be controlled has reached a predetermined position and a drive unit that drives a stepper motor stepwise by sequentially changing excited states of a predetermined number K. The apparatus allows the stepper motor to rotate in one direction by means of the drive unit and indexes the origin on the basis of the excited state in which an origin signal from the detector is detected. The apparatus of the present invention further includes: a first detection means that detects the excited state in which an origin signal is produced from the detector while the stepper motor is rotated in one direction; a storage means that stores as a reference excited state the excited state detected by the first detection means; a second detection means that activates the first detection means at the time of origin indexing and detects the difference in phase between an indexing excited state, which is the excited state detected by the first detection means, and the reference excited state already stored in the storage means; and an origin indexing means which, according to the relationship between the phase difference detected by the second detection means and the predetermined number K, indexes one of the following three positions as the origin, a center position satisfying a predetermined relationship with the indexing excited state, the center position minus K steps, or the center position plus K steps.

While a reference value for origin indexing can be set by several methods, it is preferred to use as a reference excited state the excited state in which an origin signal is detected at the time origin is first effected after power is supplied to the apparatus. This reference excited state is stored in the storage unit. The excited state in which an origin signal is detected in subsequent executions of an origin indexing mode is detected as an indexing excited state. The phase difference between this indexing excited state and the reference excited state is detected and according to the relationship between the detected phase difference and the number of excited states K, one of the following three positions is indexed as the origin:

a center position satisfying a predetermined relationship with the indexing excited state, the center position minus K steps, or the center position plus K steps. Since the origin is corrected by K steps with respect to the center position according to the timing of origin signal detection, erroneous origin indexing that might occur on account of the already described improper timing of origin signal detection can be prevented.

DESCRIPTION OF THE PREFERRED EMBODIMENTS

The present invention will be described hereinafter with reference to a specific embodiment thereof.

Figure 1:
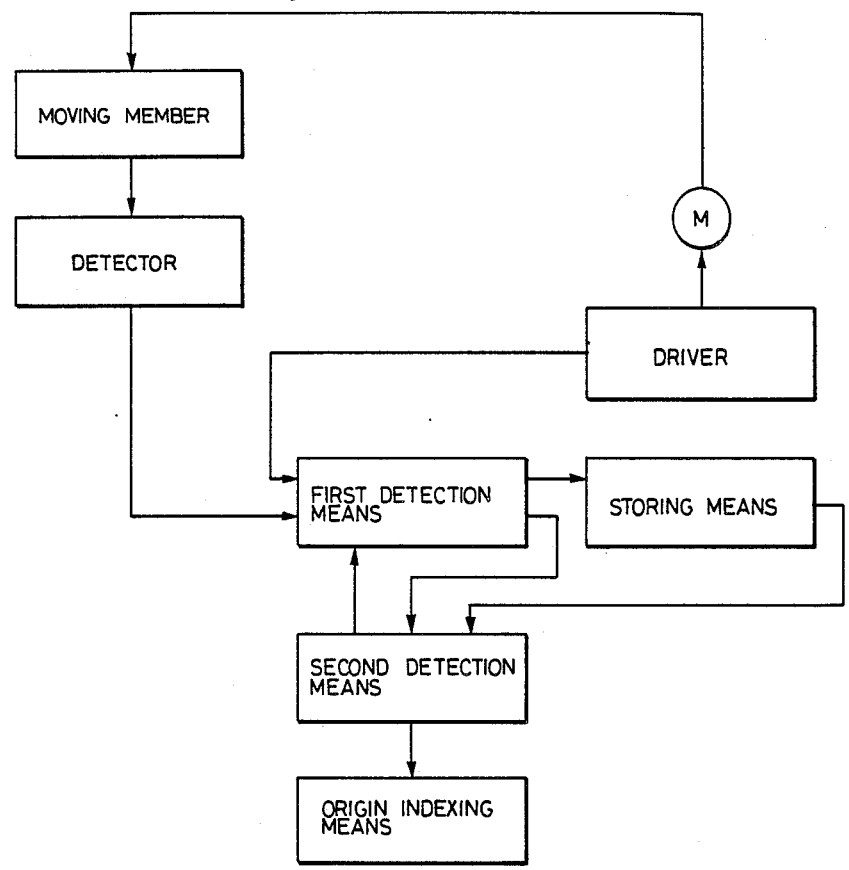
FIG. 1 is a block diagram showing the concept of the present invention.
Figure 2:
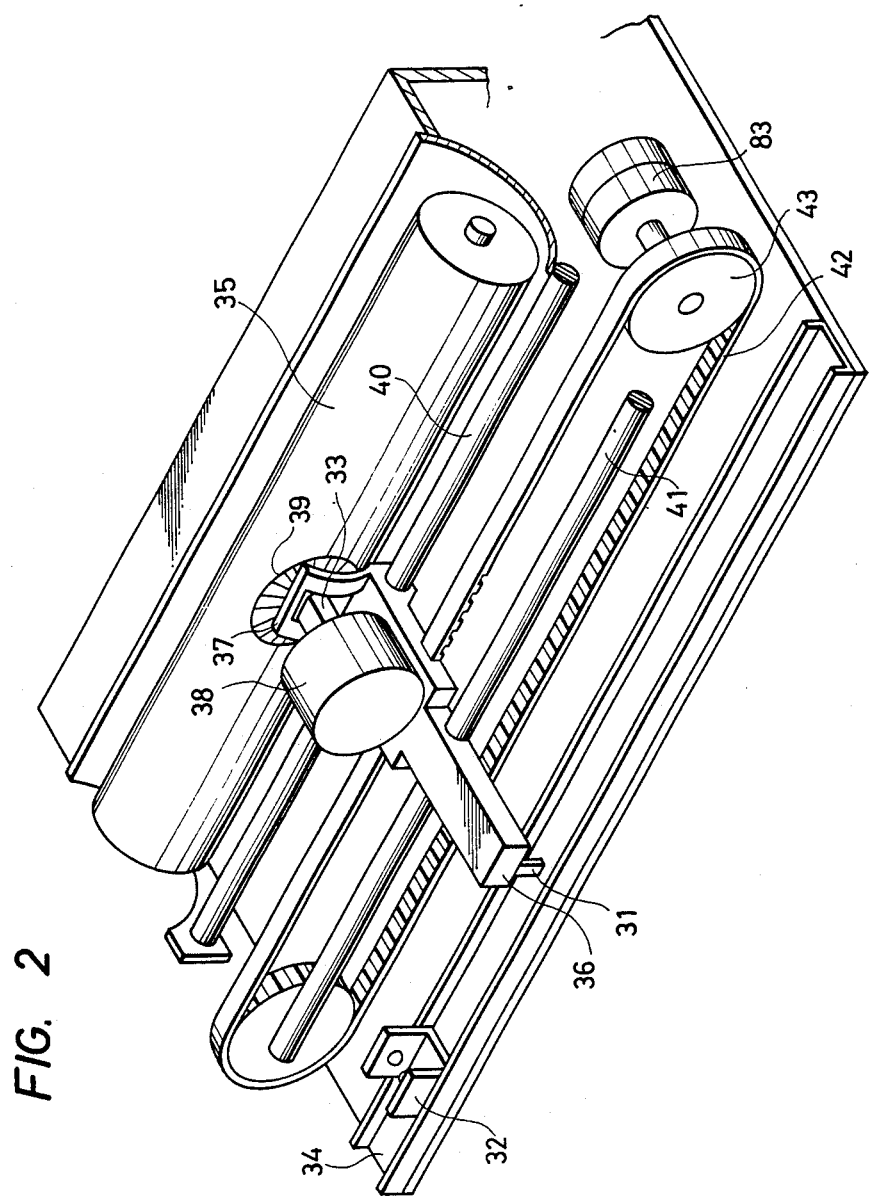
FIG. 2 is a perspective view showing the mechanism of a typewriter furnished with origin indexing apparatus according to one specific embodiment of the present invention.

FIG. 1 is a perspective view showing the mechanism of the printing section of a typewriter. As shown, a carriage 36 supports a print head 38 for driving an impression hammer 33, a paper holder 37 for guiding the sliding or turning of paper along a platen 35, and a character wheel 39. The carriage 36 is guided with guide bars 40 and 41 and is moved horizontally by means of a timing belt 42. The timing belt 42 is driven with a stepper motor (CR motor) 83 via a pulley 43. A light shield 31 is provided on the bottom of the rear end of the carriage 36, and a photointerrupter 32 is provided in the passage of travel of the light shield 31 on the position of origin at the left end of a frame 34. When the carriage 36 moving leftward reaches the position of origin, the light shield 31 blocks photocoupling of the photointerrupter 32 and an origin signal that renders it nonconductive is produced.

Figure 3:
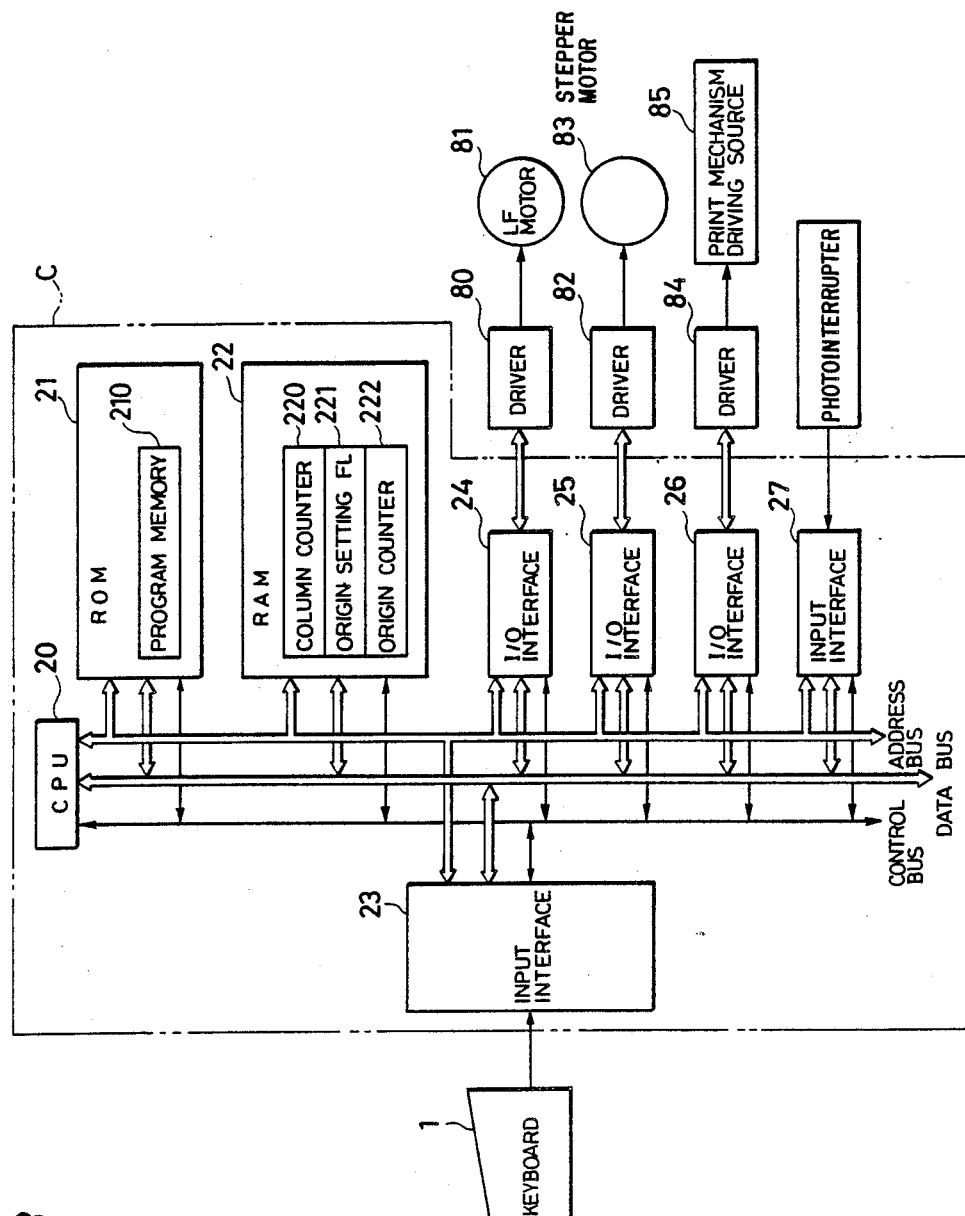
FIG. 3 is a block diagram showing the composition of an electronic control unit to be installed in the typewriter shown in FIG. 2.

FIG. 3 shows an electronic control system C of the typewriter. A central processing unit (CPU) 20 is connected to a keyboard 1 via an input interface 23. CPU 20 is also connected to ROM 21, RAM 22, I/O interfaces 24, 25, 26 and input interface 27 via an address bus, a data bus and a control bus. ROM 21 contains in it a program memory 210 with a storage of control program which, upon receiving data input from the keyboard 1, drives the printing section for producing a printed document. RAM 22 backed up with a battery contains in it a column counter 220 for storing the present horizontal position of the carriage 36, an origin setting flag 221 for storing the execution of an origin indexing mode as the initial setting after power supply to the typewriter (this indexing is hereinafter referred to as the "initial origin indexing"), and an origin counter 222 for storing the number of steps from the position corresponding to the reference excited state in which an origin signal is detected at the time of initial origin indexing to the origin which is a position corresponding to the first ensuing specified excited state (this number of steps is hereinafter referred to as the "number of reference steps").

I/O interfaces 24, 25 and 26 are connected to drive units 80, 82 and 84, respectively. The drive units are respectively connected to an LF motor 81 for paper feeding, a stepper motor (CR motor) 83 for moving the carriage 36, and a printing mechanism drive source 85 for causing such phenomena as the striking of the impression hammer 33, the lifting and feeding of an ink ribbon (not shown), and the rotation of the character wheel 39. The input interface 27 is connected to the photointerrupter 32 for outputting an origin signal.

The mechanism of the action of the origin indexing apparatus according to the embodiment under discussion is described hereinafter with reference to the flowchart shown in FIG. 4 and the illustration given in FIG. 5.

This embodiment accomplished excitation by a one-phase excitation method which sequentially excites one of the four phases A, B, C and D as shown in FIG. 5(a). If excitation proceeds in the forward order of A, B, C and D, the stepper motor 83 rotates clockwise to cause rightward movement of the carriage 36. If excitation proceeds in the reverse order of D, C, B and A, the stepper motor 83 rotates counterclockwise to cause leftward movement of the carriage 36. The phase D is assigned as the first specified excitation phase that follows the detection of an origin signal from the photointerrupter 32, and the origin corresponds to phase D excitation. FIG. 5(a) shows the relationship between the rotational positions, P0–P18, of the stepper motor 83 and the respective excitation phases.

The rotational position of the stepper motor 83 is in one-to-one correspondence with the position of the carriage 36 and positions P0–P18 are also indicative of the position of the carriage 36.

In the embodiment under discussion, initial origin indexing is executed in order to set the reference value for the first origin following power supply to the typewriter.

(1) Initial origin indexing

Figure 4:
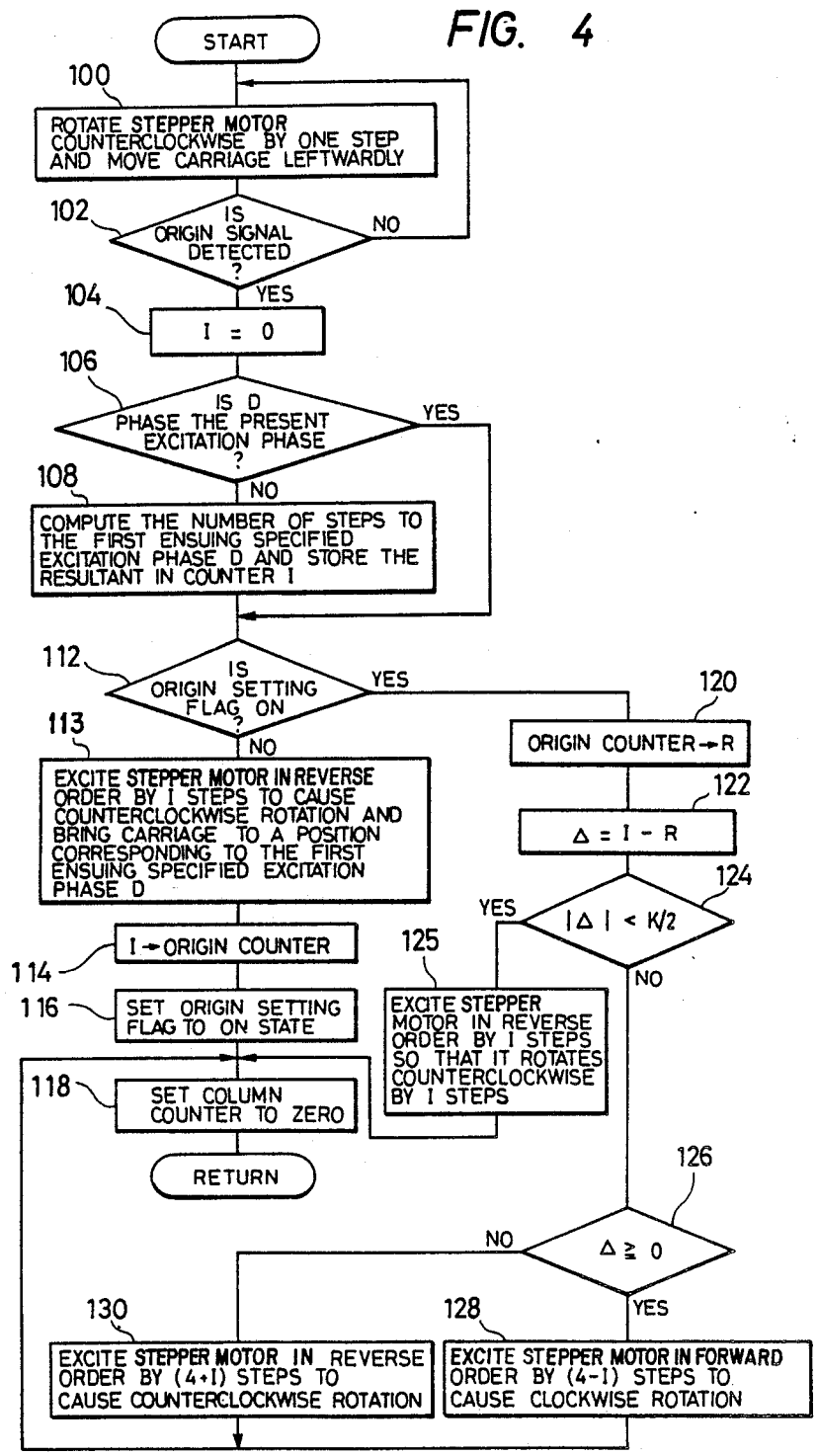
FIG. 4 is a flowchart showing the sequence of steps of processing with the CPU in the electronic control unit shown in FIG. 3.
Figure 5:
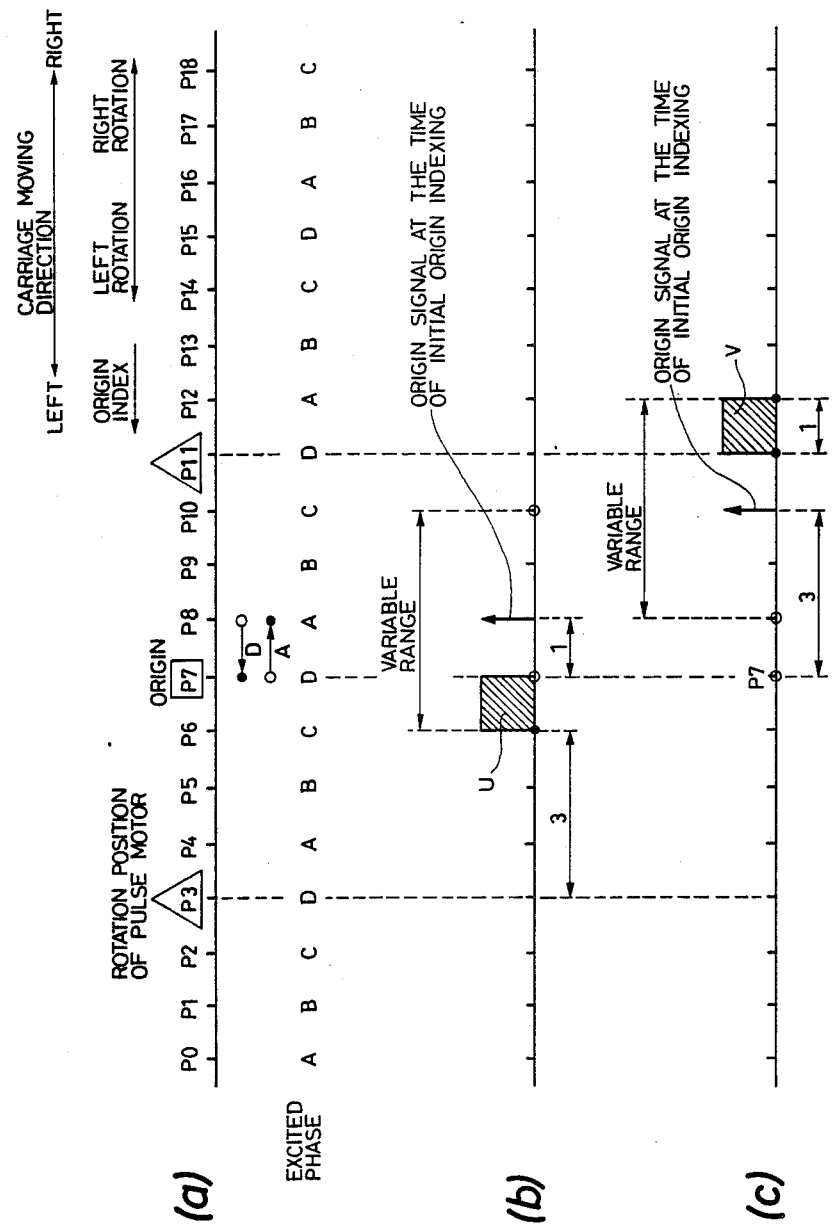
FIG. 5 is an illustration showing the procedures of origin indexing.

When power is supplied to the typewriter, the main program (not shown) is activated to instruct initial origin indexing as initial setting, whereupon the origin indexing program shown in FIG. 4 is executed.

In step 100, the stepper motor 83 is rotated conterclockwise by one step and the carriage 36 is moved toward the photointerrupter 32 by one step. In the next step 102, checking is made as to whether an origin signal has been detected from the photointerrupter 32. If the result is negative, the sequence returns to step 100 and the stepper motor 83 is further rotated counterclockwise by one step and the carriage 36 is moved leftward by one more step. Processing of step 100 is repeated and the carriage 36 is moved leftward until an origin signal is detected from the photointerrupter 32 in step 102. When it is found that an origin signal has been detected in step 102, the sequence goes to step 104 and counter I which counts the number of reference steps, or the number of steps from the present excited phase (namely, the excited phase in which an origin signal is detected and which is hereinafter referred to as the "reference excitation phase") to the first ensuing specified excited phase D, is initialized to zero.

In the next place, the sequence goes to step 106, wherein checking is made as to whether the present excited phase is the specified phase D. If the result is negative, the sequence goes to step 108, wherein the number of steps I to the specified excited phase D which appears for the first time after excitation in the reverse order is counted and stored in counter I.

If the present excited phase is found to be phase D in step 106, or if the counting of the number of steps is completed in step 108, the sequence goes to step 112 in which checking is made as to whether the origin setting flag 221 which indicates the completion of the initial origin indexing has been set to ON state. The origin setting flag 221 is reset by initialization of the main program at the time power is supplied to the typewriter. Therefore, at the time of initial origin indexing, the origin setting flag 221 is found to be in OFF state and the sequence goes to step 113, wherein reverse excitation is effected by I steps and the motor is rotated counterclockwise by I steps to bring the carriage 36 to a position corresponding to the first ensuing specified excited phase D. In the next step 114, counter I in the present state shows the number of reference steps, which is stored in the origin counter 222. In the next step 116, the origin setting flag 221 which indicates the completion of initial origin indexing is set to ON state, and in subsequent step 118 the column counter 220 is cleared to zero. The position of carriage 36 corresponding to the present specified excited phase D is initially indexed as the origin. As a result, the program under discussion is completed.

As shown in FIG. 5(b), when an origin signal is detected at rotational position P8 following excitation of phase A, rotational position P7 corresponding to subsequently specified excited phase D is initially indexed as the origin. The number of reference steps for this case is one. In a like manner, as shown in FIG. 5(c), when an origin signal is detected at rotational position P10 following excitation of phase C, rotational position P7 corresponding to subsequent specified excited phase D is initially indexed as the origin. The number of reference steps for this case is three.

In the way described above, the origin is initially indexed at rotational position P7 as the reference value for origin indexing and subsequent origin indexing (the origin indexing following the initial origin indexing is hereinafter referred to as "routine origin indexing") is controlled in such a way as to ensure exact indexing of the origin P7.

(2) Routine origin indexing

If, after the initial origin indexing, the program for origin indexing is re-addressed in response to such events as the opening of the cover on the typewriter, processing is started with step 100. As already mentioned, the stepper motor 83 is rotated counterclockwise and the carriage 36 is moved leftward until an origin signal is detected from the photointerrupter 32. If it is found that an origin signal is detected in the next step 102, the sequence goes to step 108 through steps 104 and 106. In step 108, the number of steps from the excited phase in which an origin signal is detected (the excited phase in which an origin signal is detected at the time of routine origin indexing is hereinafter referred to as the "indexing excitation phase") to D phase which is the first subsequent specified excited phase (the number of steps occurring at the time of routine origin indexing is hereinafter referred to as the "number of indexing steps") is stored in counter I.

If the present excited phase is found to be phase D in step 106, counter I counts zero and the sequence goes to step 112 wherein checking is made as to whether the origin setting flag 221 is set to ON state. In routine origin indexing, the initial origin indexing has already been completed with the origin setting flag 221 being set to ON state. Therefore, the sequence goes to step 120. In step 120, the number of reference steps is read from the origin counter 222 into a register R. In the next step 122, the difference between the number of reference steps and that of indexing steps (this difference is hereinafter referred to as "indexing deviation Δ") is computed from the contents of counter I and register R. The sequence then goes to step 124, in which checking is made as to whether the absolute value of indexing deviation Δ is smaller than half the number of excited phases (K/2). If the result is positive, the sequence goes to step 125 and excitation is effected by I steps in the reverse order and the stepper motor is rotated counterclockwise by I steps, with the position corresponding to the specified excited phase D being indexed as the origin. Thereafter, the sequence goes to step 118 in which the column counter 220 is cleared to zero which indicates the origin.

If the absolute value of indexing deviation Δ is found to be equal to or greater than K/2 in step 124, the sequence goes to step 126, in which checking is made as to whether the indexing deviation Δ is equal to or greater than zero, or whether $\Delta \geq K/2$ in consideration of the previous judgment made in step 124. If the result is positive, the sequence goes to step 128, in which the stepper motor 83 is excited by (4−I) steps in the forward order to rotate clockwise by (4−I) steps and the carriage 36 is moved rightward by (4−I) steps. The sequence then goes to step 118, wherein the column counter 220 is cleared to zero and the present rotational position of the stepper motor 83 being excited in the specified excited phase D is indexed as the origin.

If, in step 126, the value of indexing deviation Δ is found to be smaller than zero, or $\Delta \leq -K/2$ in consideration of the previous judgment made in step 124, the sequence goes to step 130 wherein the stepper motor 83 is excited by (4+I) steps in the reverse order to rotate counterclockwise by (4+I) steps and the carriage 36 is moved leftward by (4+I) steps. The sequence then goes to step 118, in which the column counter 220 is cleared to zero and the present rotational position of the stepper motor 83 being excited in the specified excited phase D is indexed as the origin.

The present invention is further described with reference to the case shown in FIG. 5(b).

The relationship between the indexing excitation phase and the reference excitation phase is subject to change for various reasons but it is supposed here that the variation in the indexing excitation phase will not exceed one cycle of the reference excitation phase. If, as shown in FIG. 5(b), an origin signal is detected at position P8 during initial origin indexing and if an origin signal is detected during routine origin indexing in the region U which is leftward of position P7 and rightward of P6 within the range of one-cycle variation (P6−P10), the conventional apparatus will index the rotational position of stepper motor 83 at position P3 that corresponds to phase D which is to be excited next. In the embodiment of the present invention being discussed, counter I counts three indexing steps in step 120 and the indexing deviation computed in step 122 is 2 (since the number of reference steps is 1). Since the condition $\Delta \geq K/2$ (K=4) is met, the sequence goes to step 128 in which the stepper motor 83 is excited in the forward order by (4−I) steps in step 128 so as to rotate clockwise by (4−I) steps and the rotational position of the stepper motor 83 is set to the origin P7 which is 4 steps rightward of position P3. Subsequently, the column counter 220 is set to zero and position P7 is indexed as the true origin that has been initially indexed.

If an origin signal is detected outside the region U within the range of variation shown in FIG. 5(b), the absolute value of indexing deviation Δ will be smaller than K/2 since the number of indexing steps is 0, 1 or 2 whereas the number of reference steps is 1. Therefore, after an origin signal is detected, the stepper motor 83 is rotated counterclockwise by I steps in step 125 until position P7 that corresponds to the first subsequently excited phase D, thereby enabling the indexing of the true origin P7 that is as initially indexed.

The present invention is hereunder described with reference to the case shown in FIG. 5(c).

If an origin signal is detected at position P10 during initial origin indexing, the origin occurs at position P7 and the number of reference steps is 3. If an origin signal is detected during routine origin indexing in the region V which is rightward of position P11 and leftward of position P12 within the range of variation, position P11 corresponds to phase D which is the specified phase to be first excited following the detection of the origin signal and the conventional apparatus will index the rotational position of the stepper motor 83 at this position P11. In the embodiment of the present invention being discussed, the number of indexing steps counted by counter I in step 120 is 1 or 0, so the indexing deviation Δ computed in step 122 is −2 or −3. Since the condition $Δ ≦ -K/2$ is met, the results of checking made in steps 124 and 126 will be both negative and in step 130, the stepper motor 83 is excited in the reverse order by (4+I) steps to rotate counerclockwise by (4+I) steps and the carriage 36 moves leftward by (4+I0) steps until it stops at the point of origin P7. In step 118, the column counter 220 is set to zero and the position P7 which was initially indexed is correctly indexed as the origin for routine origin indexing mode.

If an origin signal is detected outside the region V within the range of variation shown in FIG. 5(c), the absolute value of indexing deviation Δ will become smaller than K/2 since the number of indexing steps is 3 or 2 whereas the number of reference steps is 3. Therefore, after an origin signal is detected, the stepper motor 83 is rotated counterclockwise by I steps in step 125 until position P7 that corresponds to the first subsequently excited phase D is reached, thereby enabling the indexing of the true origin P7 that was initially indexed.

As will be apparent from the foregoing explanation, the origin to be indexed after the initial indexing according to the present invention is in exact correspondence to the initially indexed origin irrespective of variations in the relationship between the timing of origin signal detection and excited phases, so origin indexing can be accomplished with improved precision at all times of operation.

The embodiment described above assumes that the photointerrupter 32 is positioned in such a way as to index as origin P7 a position within the range of four steps (i.e., corresponding to the total number of excited phases) from the position at which an origin signal from the photointerrupter 32 was detected in initial origin indexing mode. Alternatively, the position of the photointerrupter 32 may be shifted in the rightward direction in such a way that origin P7 will coincide with the position to which the stepper motor 83 has rotated from the position of origin signal detection by more than four steps in the same direction in which the motor rotated until the origin signal was detected. In this alternative case, a position rightward of P7 will be indexed if origin indexing is performed in the same manner as in the already described embodiment. Therefore, the correct origin to be indexed should be shifted leftward (i.e., advanced) with respect to said rightwardly indexed position by a distance corresponding to the amount by which the photointerrupter 32 is shifted rightwardly with respect to the position at which it is disposed in the above described embodiment. For example, in a case where the initial origin has been indexed in the position P12 in FIG. 5(b) and the origin signal is detected in the position between P10 and P11, the carriage is not moved in the rightward direction by one step (−1), but is further moved in the leftward direction by four steps (+4). That is, the carriage is leftwardly moved by three steps (= −1+3) so that P7 can be indexed as the origin. If such a control is performed, the origin P7 to be indexed is always advanced with respect to the position where an origin signal from the photointerrupter 32 is detected. Therefore, during positioning of the carriage 36 at the origin P7, the carriage 36 will in no case have to be returned after detection of an origin signal in the direction opposite to that in which it has been moved and the operator may simply move it in the direction in which it has been moved for the purpose of detecting an origin signal. This is effective not only in reducing the burden on the stepper motor 83 but also in shortening the time required to complete the positioning of the carriage 36 at intended origin P7.

According to the present invention, a reference excited state in which an origin signal is detected during initial indexing of the reference origin is stored, and an indexing excited state in which an origin signal is detected during execution of an origin indexing mode following the initial origin indexing is detected. The phase difference between the indexing excited state and the reference excited state is also detected, and on the basis of the relationship between the detected phase difference and the number of excited states K, one of the following three positions is indexed as the origin, a center position satisfying a predetermined relationship with the indexing excited state, the center position minus K steps, or the center position plus K steps. The present invention designed in this way has the advantage that the true origin that was initially indexed as a reference can always be indexed in subsequent routine operations in spite of variations in the relationship between the timing of origin signal detection and a specific excited phase. As a result, the origin of a moving member to be driven with a stepper motor can be indexed with improved precision.

What is claimed is:

1. In an origin indexing apparatus for indexing an origin of a moving member, including a detector for detecting a position of the moving member and outputting an origin signal when the moving member has reached a predetermined position, a multi-phase, rotatable stepper motor for moving the moving member, the stepper motor being rotated stepwise by sequentially exciting one of K phases of the stepper motor, and a driving unit for driving the stepper motor, wherein origin indexing of the moving member is performed on the basis of an excited phase at which the origin signal from the detector is produced, the improvement wherein said apparatus comprises:

a first detection means for detecting said excited phase at which the origin signal is produced from said detector while said stepper motor is being rotated in a predetermined direction;

a storage means for storing as a reference excitation phase said excited phase detected by said first detection means at a specific time instant;

a second detection means for detecting a phase difference between said reference excitation phase stored in said storage means and an indexed excitation phase, said indexed excitation phase being detected by said first detection means at the time of said origin indexing after said specific time instant; and an origin indexing means for indexing one of the following three positions as said origin on the basis of said phase difference and said predetermined number K; a center position corresponding to a subsequent specified phase appearing in the same cycle following said indexed excitation phase while said stepper motor is being rotated in said predetermined direction, a position downstream from said center position by a distance corresponding to K phases and a position upstream from said center position by a distance corresponding to K phases of said stepper motor.

2. An origin indexing apparatus according to claim 1, wherein said first detection means detects said excited phase as a number of steps from a first position corresponding to the excited phase at which said origin signal is produced from said detector to a second position corresponding to said subsequent specified phase of said stepper motor, said storage means storing the number of steps indicative of said reference excitation phase, and said second detection means detects said phase difference in terms of the number of steps corresponding to a difference between the number of steps detected as said indexed excitation phase by said first detection means and the number of steps stored in said storage means.

3. An origin indexing apparatus according to claim 2, wherein said origin indexing means comprises:

a first origin indexing means for indexing as the origin said second position if an absolute value of the number of said steps detected by said second detection means is smaller than K/2;

a second origin indexing means for indexing as the origin a position obtained by subtracting K steps from said second position if the number of said steps detected by said second detection means is equal to or greater than K/2; and a third origin indexing means for indexing as the origin a position obtained by adding K steps to said second position if the number of said steps detected by said second detection means is equal to or smaller than $-K/2$.

4. An origin indexing apparatus according to claim 3, wherein said moving member is a printing head of a printer movable along an axial direction of a platen.

5. An origin indexing apparatus according to claim 1, wherein said center position corresponds to said subsequent specified phase appearing in the same cycle while said stepper motor is being rotated in said predetermined direction.

6. An origin indexing apparatus according to claim 1, wherein said storage means stores the excited phase detected by said first detection means when said origin signal is produced for the first time after initial power supply.

7. In an origin indexing apparatus for indexing an origin of a moving member including a detector for detecting a position of the moving member and outputting an origin signal when the moving member has reached a predetermined postion, a stepper motor operably connected to the moving member, the stepper motor being rotated stepwise by sequentially exciting one of K excitation phases having a specified excitation phase, and a driving unit for driving the stepper motor, wherein origin indexing of the moving member is performed on the basis of an excited phase at which the origin signal from the detector is produced, the improvement wherein the apparatus comprises:

a first detection means for detecting the excited phase at which the origin signal is produced from said detector while said stepper motor is being rotated in a predetermined direction;

a storage means for storing as a reference excitation phase said excited phase detected by said first detection means at a specific time instant when the origin signal is produced for the first time after initial power supply;

a second detection means for detecting a phase difference between said reference excitation phase stored in said storage means and an indexed excitation phase, said indexed excitation phase being detected by said first detection means at the time of said origin indexing after said specific time instant; and an origin indexing means for indexing one of the following three positions as said origin on the basis of said phase difference and said predetermined number K; a center position corresponding to the subsequent specified phase appearing in the same cycle following said indexed excitation phase while said stepper motor is being rotated in said predetermined direction, a position downstream from said center position by a distance corresponding to K phases and a position upstream from center position by a distance corresponding to K phases of said stepper motor.

8. An origin indexing method of indexing an origin of a moving member, with an apparatus comprising a detector for detecting a position of the moving member and outputting an origin signal when the moving member has reached a predetermined position, a multi-phase, rotatable stepper motor for moving the moving member, the stepper motor being rotated stepwise by sequentially exciting one of K phases of the stepper motor, and a driving unit for driving the stepper motor, wherein origin indexing of the moving member is performed on the basis of an excited phase at which the origin signal from the detector is produced, said method comprising the steps of:

(a) detecting said excited phase at which the origin signal is produced from said detector while said stepper motor is being rotated in a predetermined direction;

(b) storing as a reference excitation phase said excited phase detected in step (a) at a specific time instant when the origin signal is produced for the first time after initial power supply;

(c) detecting a phase difference between said reference excitation phase stored in step (b) and an indexed excitation phase, said indexed excitation phase being detected in step (a) at the time of said origin indexing after said specific time instant;

(d) checking whether an absolute value of said phase difference is smaller than a half the predetermined number K;

(e) if the checking made in step (d) indicates that the absolute value thereof is smaller than the half the predetermined number K, rotating said stepper motor in a direction opposite to said predetermined direction by a first predetermined number of steps determined by said indexed excitation phase;

(f) if the checking made in step (d) indicates that the absolute value thereof is equal to or greater than the half the predetermined number K, checking whether said phase difference is equal to or greater than zero;

(g) if the comparison made in step (f) indicates that the phase difference is equal to or greater than zero, rotating said stepper motor in said predetermined direction by (K−I) where I is the number identifying the reference excitation phase from the position of said indexed excitation phase; and (h) if the comparison made in step (f) indicates that the phase difference is smaller than zero, rotating said stepper motor in said direction opposite to said predetermined direction by (K+I) from the position of said indexed excitation phase.

* * * * *